Aug. 1, 1972  I. W. MILLS ET AL  3,681,233
MAKING A CABLE OIL BY ACID EXTRACTION AND HYDROFINING
Original Filed March 13, 1967
PRODUCTION OF CABLE OIL BY
REFINING OF 6000 SUS (AT 100°F)
NAPHTHENIC ACID-FREE, NAPHTHENIC DISTILLATE
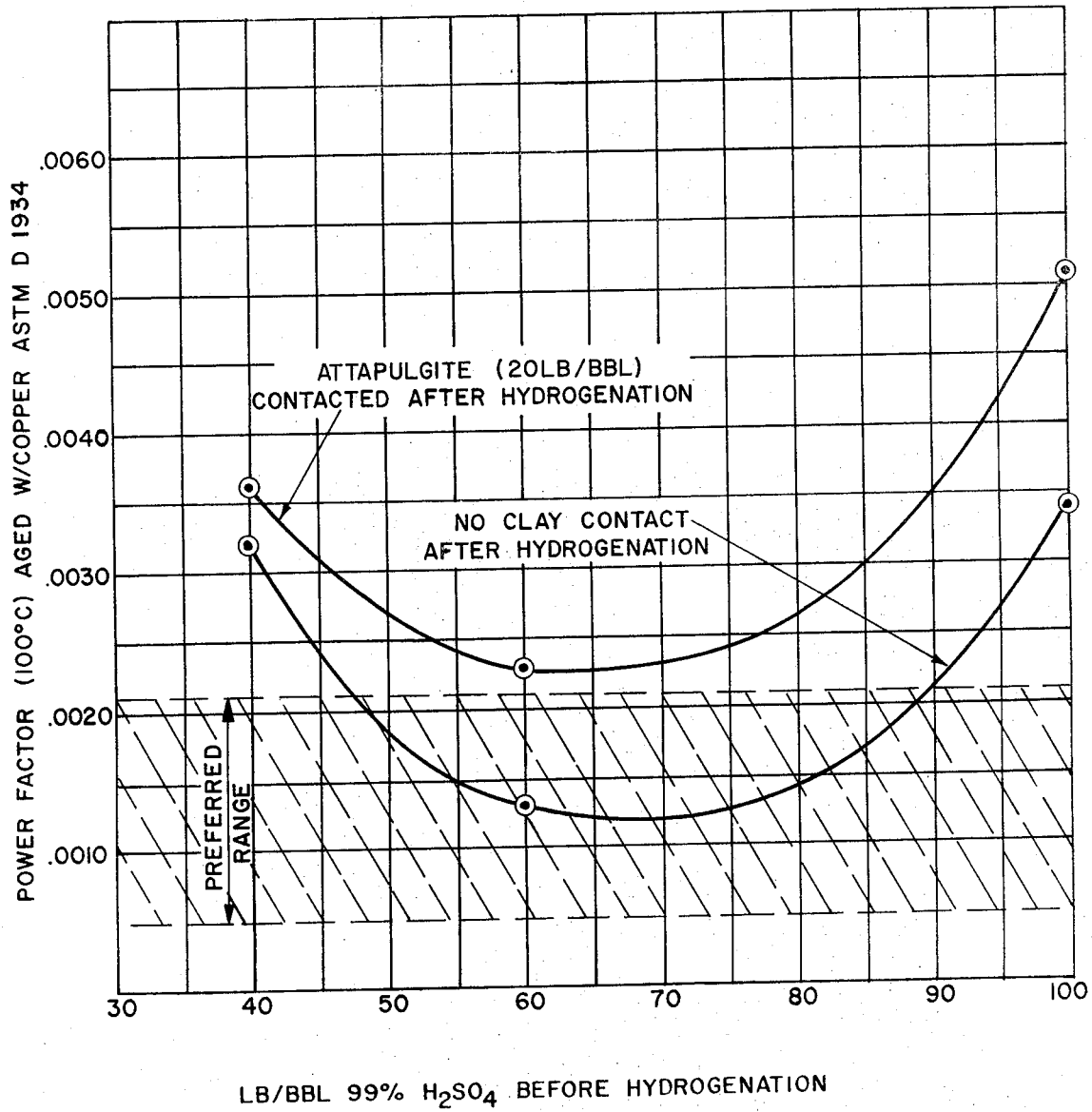
INVENTORS
IVOR W. MILLS
GLENN R. DIMELER
BY
*Barry A. Bisson*
ATTORNEY United States Patent Office 3,681,233
Patented Aug. 1, 1972

3,681,233
MAKING A CABLE OIL BY ACID EXTRACTION
AND HYDROFINING
Ivor W. Mills, Media, and Glenn R. Dimeler, West
Chester, Pa., assignors to Sun Oil Company, Philadelphia, Pa.
Continuation-in-part of applications Ser. No. 622,398,
Mar. 13, 1967, now Patent No. 3,462,358, Ser. No. 652,026, July 10, 1967, now Patent No. 3,502,567, Ser. No. 730,999, May 22, 1968, Ser. No. 850,716 and Ser. No. 850,717, both Aug. 18, 1969, and Ser. No. 873,008, Oct. 31, 1969. This application Mar. 24, 1970, Ser. No. 22,295
The portion of the term of the patent subsequent to
Mar. 24, 1987, has been disclaimed
Int. Cl. C10g 17/00
U.S. Cl. 208—91
11 Claims

ABSTRACT OF THE DISCLOSURE

Low ADF, 2000-12,000 SUS (at 100° F.) cable oils are prepared from naphthenic lube fractions by a process comprising acid-treating (e.g., $SO_3$, HF, $H_2SO_4$), neutralizing, and hydrorefining at 550°–750° F. and 800–3000 p.s.i. of hydrogen. Prior to hydrorefining, the neutralized oil can be contacted with an adsorbent comprising bauxite or a naturally-occurring fuller's earth bleaching clay, such as attapulgite, as a precaution to insure that the hydrorefining catalyst will not be poisoned by trace impurities. The naphthenic lube fraction is preferably substantially free from naphthenic acids and can be a raffinate from extracting of a distillate with an aromatic selective solvent (e.g. furfural, phenol, etc.).

CROSS REFERENCE TO RELATED APPLICATIONS

The present application is a continuation-in-part of all of the following earlier filed, commonly assigned applications of the present inventors, Ivor W. Mills and Glenn R. Dimeler:

| Serial No. | Filing date | Patent No. | Issue date | Title |
|---|---|---|---|---|
| 622,398 | 3-13-67 | 3,462,358 | 8-19-69 | Clay Treatment of Hydrorefined Cable Oils. |
| 652,026 | 7-10-67 | 3,502,567 | 3-24-70 | Process for Producing Cable Oils by Sequential Refining Steps. |
| 730,999 | 5-22-68 | | | Hydrorefined Transformer Oil and Process of Manufacture. |
| 850,716 | [1] 8-18-69 | | | Blended Hydrocarbon Oil and Process of Manufacture. |
| 850,717 | 8-18-69 | | | Hydrorefined Lube Oil and Process of Manufacture. |
| 873,008 | 10-31-69 | | | Oil and Process of Manufacture of Blended Hydrorefined Oil. |

[1] Now abandoned.

In addition to the previously noted patent applications, the following earlier filed copending applications, all assigned to the Sun Oil Company (as is the present application), are related to the disclosure of the present application. The disclosure of all of the following applications and of the above-cited patent applications is hereby incorporated in the present application:

| Serial No. | Filing Date | Title |
|---|---|---|
| 636,493 | 5-5-67 | Process for Preparing an Aromatic Oil and Non-discoloring Rubber Composition Containing Said Oil—Ivor W. Mills, Glenn R. Dimeler and Merritt C. Kirk, Jr. |
| 792,131 | 1-17-69 | High Modulus Composition Comprising Hydrocarbon Oil, Rubber and Carbon Black—Ivor W. Mills, Glenn R. Dimeler, Merritt C. Kirk, Jr. and Jackson S. Boyer. |
| 812,516 | [1] 2-19-69 | Catalytic Hydrofinishing of Petroleum Distillates in the Lubricating Oil Boiling Range—Ivor W. Mills, Merritt C. Kirk, Jr. and Albert T. Olenzak. |
| 850,778 | 8-18-69 | Process for Preparing High Viscosity Hydrorefined Cable Oil—Ivor W. Mills, Glenn R. Dimeler, William A. Atkinson, Jr. and James P. Hoffman. |
| 850,779 | [2] 8-18-69 | Electrical Conduit Containing Hydrorefined Oil—Ivor W. Mills, Glenn R. Dimeler and John J. Melchiore |
| 874,087 | 10-27-69 | Light-Colored Highly Aromatic Oil and Process of Preparation—Ivor W. Mills, Glenn R. Dimeler and Merritt C. Kirk, Jr. |

[1] Now U.S. Pat. 3,619,414.
[2] Now U.S. Pat. 3,586,752, issued June 22, 1971.

BACKGROUND OF THE INVENTION

Although some cable oils are produced by synthesis, as by the polymerization of butenes, the more satisfactory cable oils are produced by refining selected fractions of naphthenic crude oils. Despite the very low ASTM D1934 initial (IDF) and aged (with copper for 96 hours at 115° C.) dissipation factors (ADF) of the polybutene cable oils (ADF in the order of 0.005), they suffer from the disadvantages, when compared to refined naphthenic oils, of increased volatility, thermal instability, oxidation instability, and poor electrical properties (e.g., a high power factor) in a closed-system oxidation test. The polybutene cable oils also contain reactive olefins and traces of chlorine, which are undesirable components in cable oils, and develop considerable acidity and increase in viscosity on PFVO aging.

It has also been found that cables containing polybutene oils are not superior in electrical characteristics to those cables containing properly refined naphthenic oils, thus showing that a low dissipation factor is not the sole criterion for a cable oil. However, due to the market appeal of a low ADF, the petroleum refiner is actively seeking means of further lowering the ADF of present naphthenic cable oils (0.04–0.10) which are conventionally refined from naphthenic distillates by solvent extraction (as with furfural) followed by treating with sulfuric acid and clay contacting. Illustrative of such processing are British Pat. Nos. 536,863 and 946,540. Preferably the naphthenic distillates have been caustic treated, for example, as by the processes disclosed in the following U.S. patents: 2,770,580; 2,795,532; 2,944,014; 2,966,456; 3,080,312.

SUMMARY OF THE INVENTION

We have discovered a process of refining a naphthenic distillate oil to produce a cable oil having an ASTM D1934 ADF (with copper) below 0.0020 and about as low as the ADF (or power factor) of a polybutene cable oil having the same viscosity at 100° F. Our process comprises contacting the naphthenic distillate with an inorganic Lewis acid which is capable of extracting polar compounds from the distillate, allowing the resultant sludge to settle to produce an acidic oil layer, treating the acidic oil layer (as with a base and/or an adsorbent and/or washing and/or drying) to provide a neutral oil (containing 0–2000 p.p.m. water), hydrorefining a neutral oil produce a hydrogenated oil having an ultraviolet adsorptivity at 260 mm. which is at least 40 percent (preferably at least 60 percent) less than that of the naphthenic distillate. In order to minimize the ADF, the hydrorefined oil is not further treated with earth bleaching clay (in contrast to said Ser. No. 652,026 which can require final clay contacting).

In our copending application, Ser. No. 622,398, we disclosed that superior cable oils can be produced from naphthenic lube oil fractions by severe hydrorefining followed by contacting with an adsorbent, such as clay. In the case of the high viscosity cable oils (4000–6000 SUS at 100° F.), the type of clay used and the dosage of clay have no critical effect on the aged dissipation factor (ADF) of the resulting oil and the preferred adsorbent is a relatively inexpensive naturally-occurring fuller's earth bleaching clay. However, with the lower viscosity cable oils (500–2000 SUS) both the nature of the clay and the clay dosage are critical if one wishes to obtain a cable oil having an ADF below 0.010, that is, which approaches that of the synthetic polyolefin cable oils, such as the polybutene oils. We further disclosed that sulfuric acid treating of the severely hydrogenated 500–2000 SUS naphthenic oils, prior to clay contacting, does not sufficiently improve the ADF to warrant the expense of such additional treatment and that, with the higher viscosity cable oils (e.g. 4000–6000 SUS), such $H_2SO_4$ treatment of the hydrorefined oils prior to clay contacting can actually be detrimental in that the resulting refined oil can have a larger ADF than a similarly hydrogenated oil which is refined by clay contacting alone.

The present application deals with our unexpected finding that if a naphthenic distillate oil is acid treated (as with $H_2SO_4$) and neutralized prior to severe hydrogenation and is not given a final clay contact, the resulting refined naphthenic oil will have a lower ADF than can be obtained by the process of our application Ser. No. 652,026, now Pat. 3,502,567 (which can require such a final clay finish to insure a low IDF). This oil produced by the present invention is especially useful as an insulating fluid in electrical cables carrying greater than 500 kv. Such an insulating fluid can contain the usual inhibitors and from 0–90 volume percent based on the naphthenic cable oil, of polybutene cable oil.

Our finding of an unexpected advantage to this process sequence for the production of electrical oils is to be compared with the teachings of U.S. 2,973,317 which discloses that acid treatment after hydrogenation of a 1600 SUS (at 100° F.) naphthenic distillate produces higher yields of lube oils than does the reverse procedure (acid treatment prior to hydrogenation).

Our discovery is also distinguished from the process of U.S. 2,973,315, wherein a naphthenic distillate having a viscosity at 100° F. of 1594 SUS is contacted with 32 lbs./bbl. of 98 percent $H_2SO_4$, allowed to settle, separated from the resulting sludge, and the resulting acidic oil, having an acid number of 1.34, is subjected to hydrogenation at 700° F. and 500 p.s.i.g. to produce a lube oil having a viscosity of 802 SUS at 100° F. and an acid number of 0.0.

In the process of U.S. 2,973,315, the $H_2SO_4$ treated oil is not neutralized prior to hydrogenation and no clay contacting is used. In contrast, in our process, in order to obtain a cable oil having an ADF less than 0.0020, (typically 0.0020–0.0005) neutralization, preferably with basic salt, to an ASTM D974 acid number less than 0.1, preferably less than 0.05, is an essential step prior to hydrorefining since this improves the severity of the hydrogenation, as measured by the decrease of ultraviolet absorptivity in the 260 mm. region (260 UVA). In the process of U.S. 2,973,315, the dissolved acidic components rapidly reduce the activity of the hydrogenation catalyst.

Also to be distinguished is the method of U.S. 2,994,015 wherein a naphthenic lube fraction having a viscosity at 100° F. of from 50–6000 SUS is acid-treated with 5–10 lbs./bbl. of $H_2SO_4$, the resulting acid oil neutralized with soda ash solution, and then hydrogenated at 450°–700° F. and 400–700 p.s.i.g. In this method, from 5–30 SCF of hydrogen are reacted per barrel of oil to improve the color, color stability, and oxidation stability of the oil. This process is similar to that of the present application except that it utilizes a mild hydrogenation procedure (or hydrotreatment) which is not sufficiently severe to reduce the 260 UVA of a naphthenic distillate oil by at least 40 percent. In our process the hydrogen consumption is greater than 100 SCF/bbl. (usually 200–400 SCF/bbl.) and the hydrogen pressure must be at least 800 p.s.i.a. (preferably at least 1000 p.s.i.a.) in order to reduce the 260 UVA of a naphthenic lube feed by at least 40 percent (preferably more than 60 percent). The hydrogen purity can be in the range of 70–100%.

DESCRIPTION OF THE INVENTION

The base oils which are hydrorefined are obtained, for example, by vacuum distillation (as in U.S. 3,184,396) of naphthenic crude oils (which preferably are substantially free of naphthenic acids). Usually (to maintain a high viscosity and/or a high flash point) materials boiling below about 600° F. are removed from the hydrorefined oils, as by atmospheric distillation, prior to clay contacting.

By hydrorefining, we refer to processes conducted in the presence of a hydrogenation catalyst at from about 550°–750° F. and from 800–3000 p.s.i. of hydrogen partial pressure at a liquid hourly space velocity of from 0.2–8.0, preferably conducted either in vapor phase or trickle phase. Product recycle, for example, as in U.S. 2,900,433, can be used, preferably at a product to fresh feed ratio below 10:1 (more preferably 8:1 to 1:1).

Preferably the temperature is below that at which substantial cracking occurs; that is, no more than 20 weight percent (preferably less than 10%) of the feed stock is converted to material boiling below 300° F. Although the maximum hydrogenation temperature which will not produce substantial cracking is somewhat dependent upon the space velocity, the type of catalyst and the pressure, generally it is below 750° F. We prefer to operate below 700° F., more preferably below 675° F. At total pressures below 2000 p.s.i.g. we prefer a temperature no greater than 650° F. since above that temperature (with a fairly fresh catalyst) the production of low boiling material and the degradation of oil viscosity become substantial. After some months of use, if the activity of the catalyst decreases appreciably, higher temperatures (ca. 675° F.) can be used to prolong catalyst life, i.e., to delay regeneration or replacement of the catalyst.

We further prefer to operate at conditions such that hydroaromatization is not a dominant reaction. That is, the temperature, pressure, liquid hourly space velocity (LHSV) and hydrogen recycle rate should be chosen such that the gel aromatic content of the resulting hydrorefined oil is not greater than that of the base oil after acid treatment (i.e., the neutral oil).

For example, at a fresh feed LHSV of 0.2–1.0 and recycle LHSV of 2–5, with sulfided nickel-molybdenum oxides as the catalyst, hydroaromatization will be observed at about 750° F. at hydrogen partial pressures below about 1500 p.s.i. if there is no hydrogen recycle. If the hydrogen recycle is about 4000 s.c.f./minute, hydroaromatization will not dominate at the same temperature unless the total hydrogen pressure is below about 1000 p.s.i.

Such avoidance of hydrocracking and hydroaromatization in the production of cable oils by the present invention is to be contrasted with the discovery that in the production of transformer oils from a 40–70 SUS (at 100° F.) naphthenic distillate oil by hydrorefining, it is advantageous to choose conditions (e.g., 625° F., 1200 p.s.i.g. of 80% $H_2$) such that the sulfur and nitrogen contents of the oil are substantially reduced with a resulting partial saturation of polycyclic aromatic hydrocarbons such that the ultraviolet absorptivity at 335 millimicrons (335 UVA) is below 0.04 (preferably below 0.01). However, the electrical properties of the resulting transformer oil on aging are improved if the so-refined oil is subjected to hydroaromatization and/or hydrocracking conditions (usually, at 1000–1500 p.s.i.g. and a temperature above 675° F.) for a sufficient time to increase the content of tetracyclic and higher aromatic hydrocarbons such that the 335 UVA of the resulting refined oil is from 0.05 to 0.5. After adsorbent contacting, the resulting transformer oils can have a sludge-free Doble life of at least 64 hours (typically over 100 hours).

Typical of such severe hydrorefining methods, which can be used in our process when conducted within the aforementioned processing conditions, are those of U.S. 2,968,614; 2,993,855; 3,012,963; 3,114,701; 3,144,404; and 3,278,420.

Typical catalysts are molybdenum oxide, cobalt-molybdenum oxides, nickel-molybdenum oxides, cobalt-nickel molybdenum oxides and tungsten-nickel molybdenum oxides, preferably presulfided and on a carrier such as silica, alumina, alumina-titania and aluminosilicates (either crystalline or amorphous). Nickel sulfide, nickel-molybdenum sulfide, tungsten disulfide, nickel-tungsten sulfide and molybdenum disulfide, per se or on a carrier, can also be used as catalysts. Examples of operable catalysts are those of U.S. 2,744,052; 2,758,957; 3,053,760; 3,182,016; 3,205,165; 3,227,646; and 3,264,211.

We prefer that such hydrorefining (or severe hydrogenation) be a trickle phase process (although gas phase operation with hydrogen recycle up to 12,000 s.c.f./b. can be utilized) at 575°–675° F. and 900–1500 p.s.i. of hydrogen partial pressure using a catalyst comprising nickel and molybdenum sulfides on alumina or silica. Usually a cobalt-molybdenum catalyst will require 25–100 percent greater hydrogen pressure, at a given temperature, recycle and LHSV, to produce a cable oil comparable to that obtained with a sulfided nickel-molybdenum catalyst.

As has been noted in U.S. 2,973,315, the severity of hydrogenation can be measured by the hydrogen consumption; however, with cable oils we prefer to follow severity by observing the decrease in ultraviolet absorptivity in the 260 millimicron region. That is, due to hydrogenation of polycyclic aromatic hydrocarbons, the resulting hydrogenated oil will have lower ultraviolet adsorptivity in the 260 millimicron region than will the base oil before hydrogenation. Typically, after severe hydrogenation, the 260 mm. adsorptivity is less than 7.5 for a 4000–6000 SUS naphthenic distillate oil, less than 6 for 900–3000 SUS oil, and less than 4.5 for a 300–800 SUS oil. Preferably, in the 3000–8000 SUS range, the hydrogenated oil will contain less than 0.2% sulfur and less than 500 p.p.m. of nitrogen. The ADF of the higher viscosity (above 4000 SUS) severely hydrorefined oils will be less than 0.010 but the lower viscosity (below 1000 SUS), severely hydrorefined oils will have ADFs above 0.015, typically above 0.020. Due to differences in aromatic, sulfur and nitrogen content of the base oils, hydrogen consumption can vary greatly; however, usually hydrogen consumption for a naphthenic acid-free distillate is at least 150 s.c.f./bbl. (typically about 300 s.c.f./bbl.).

A cause of such hydrogen consumption is that we prefer to hydrorefine at conditions (e.g., 575–650° F., 900–1500 p.s.i.g. of 100% $H_2$, no gas recycle, sulfided Ni—Mo catalyst) such that the total gel aromatics in the feed to the hydrorefining step are reduced by about 5 to 25% (mainly due to removal of polar compounds) and most (55–90%) of the dicyclic and higher aromatics in the feed are converted to monocyclic aromatics.

In contrast, mild hydrogenation processes frequently consume less than 150 s.c.f. of $H_2$/bbl. and are characterized by little change in polycyclic aromatic content of the oil. Mild hydrogenation is frequently termed "hydrotreating" and is usually conducted below 800 p.s.i. of hydrogen or below 550° F. Typical of mild hydrogenation treatment are U.S. 2,865,849; 2,921,025; 2,944,015; and 3,011,972.

Under hydrorefining conditions of equal severity, our acid-treated neutral oil will consume somewhat less hydrogen than the parent distillate from which it is obtained. Such a hydrorefined, acid-treated oil will have a lower ADF, a lower 260 UVA (at least 30% lower) and contain less sulfur, nitrogen and polar compounds than will the parent naphthenic distillate after hydrorefining with the same catalyst at the same conditions of temperature, pressure, LHSV, and gas recycle.

The acid treatment of the oil can be by any conventional process utilizing an inorganic Lewis acid which is capable of extracting polar compounds from the oil and so long as the separation of the resultant sludge (or extract) and residual acidic material from the oil is substantially complete after neutralization. The acid treatment is preferably with 10–60 lbs./bbl. of 93–120% $H_2SO_4$ and can be by processes such as those of U.S. 2,279,461 and U.S. 2,282,033. Although concentrated $H_2SO_4$ is the preferred acid, other acids can be used, such as oleum or $SO_3$ (see U.S. 2,908,638), chlorosulfuric acid, HF, $AlCl_3$, $BF_3$, $HF$-$BF_3$, $SbCl_3$, $SbCl_5$, etc.

In general, the naphthenic distillate, which may be diluted with an inert, less viscous solvent, is mixed with the Lewis acid. Two phases form, an oil phase and an acid phase which is insoluble in the oil phase and which contains components extracted from the naphthenic distillate. The oil phase will comprise unextracted components of the parent distillate and dissolved acidic material. The oil phase is separated from the acid phase and is contacted with an adsorbent for the acidic material and/or mixed with an alkaline reagent to neutralize the dissolved acidic material and the so-formed neutralization products are separated from the oil phase, as by washing, to produce a neutral oil.

Neutralization of the acid-treated oil, prior to severe hydrorefining, can be effected by any conventional process such as those of U.S. 1,695,198; 1,847,623; 2,885,355; 3,011,972; 3,108,062; 3,216,925. When the acid used is from 10–60 lbs./bbl. of 93–120% sulfuric acid, we prefer that the neutralization be with a base, such as caustic followed by a wash with water, a $C_1$–$C_4$ aliphatic alcohol, a $C_2$–$C_4$ aliphatic aldehyde, a $C_3$–$C_5$ aliphatic ketone or mixtures thereof. To maintain catalyst activity and, thus, obtain sufficient severity of the hydrorefining, the acidity of the neutralized oil must be less than 0.05 mg. KOH per gram of oil (preferably 0.00).

HF treatment (5–50 percent by weight of the oil) at 30°–200° F. possesses the advantage of removing undesirable nitrogen, sulfur and oxygen-containing polar aromatic compounds from the oil but not the desirable aromatic hydrocarbons. Dilution (0.5 to 5 volumes of solvent per volume of oil) with a lower boiling (below 350° F.), inert (will not react with the acid), less viscous solvent (below 30 SUS at 100° F.), such as naphtha, benzene, isooctane, aviation alkylate, or n-heptane, etc. can be used to improve contact (by decreasing solution viscosity) at the lower temperatures (e.g. 0°–90° F.). The pressure used is preferably such that the HF, at the temperature employed, is in the liquid phase. Neutralization of the acidic oil remaining after sludge removal can be by washing, distillation, or by adsorbent treatment (as with bauxite or clay) or by a combination thereof.

A single treatment with hydrogen fluoride may be employed, or a plurality of treatments with hydrogen fluoride with separations of sludge between treatments. In the latter manner of operation, a smaller total amount of hydrogen fluoride generally is required to obtain a given degree of treatment than in the case of a single treating stage.

The sludge obtained from such HF treatment differs from the sludge obtained from $H_2SO_4$ treatment of a petroleum distillate in that the reaction of the HF and the polar aromatics is readily reversible and S, N, and O compounds of the sludge can be recovered therefrom by distilling the sludge to remove (and recover) HF. The so-recovered S, N, and O compounds appear to be essentially the same as those present in the original oil charge.

In contrast it is very difficult and expensive to recover acid from $H_2SO_4$-sludge and such recovery methods (as by pyrolysis) destroy or greatly alter the organic portion of the sludge.

Despite the advantages of HF for such acid-refining, $H_2SO_4$ will usually be the acid chosen by the refiner.

It is sometimes advantageous to use solvent extraction prior to such acid-treating. In this embodiment, any of the well known selective solvents for aromatics can be employed, e.g., furfural, phenol, sulfur dioxide, nitrobenzene, B,B'-dichloroethyl ether, etc. Temperatures of 100°–250° F. and solvent-to-oil ratios of 1–4:1 are preferred. Extract yield is usually 10 to 30 weight percent of charge. Other conditions and yields are contemplated in some cases. Highly aromatic, non-discoloring rubber process oils (e.g., 45–90% aromatics) can be prepared from such extracts by a sufficiently severe acid-treatment to reduce the polar aromatic content of the product oil to less than 3 percent or by hydrorefining under conditions such that the aromatic content of the oil is essentially maintained, or is increased (as by hydroaromatization).

Frequently a combination of solvent extraction and acid-treatment is less expensive than the use of acid treatment alone to produce a neutral oil of given aromaticity and polar content, because the more aromatic oil recovered from a solvent extract has a better market value than the residue from acid refining. For example, solvent extraction can generally be used to decrease acid consumption by about 50%. Such a combined process allows the production (from the raffinate) of a less polar oil of given aromatic content than can be produced solely by extraction with an aromatic selective solvent, such as furfural, $SO_2$, or phenol.

Solvent extraction, however, cannot be a complete substitute for acid-treatment since it is characteristic of extraction with an aromatic selective solvent (within the ranges of temperature and solvent-to-oil ratio practiced by the prior art) that the solvent extracts the desirable aromatic hydrocarbons along with the undesirable polar aromatic compounds. After a given degree of aromatic removal has been obtained by solvent extraction, further extraction results in a more selective removal of the desirable aromatic hydrocarbons from the raffinate and the relative polar aromatic content of the refined raffinate oil with no decrease. In fact, in such a "deeper" raffinate, the ratio of polar aromatics to total aromatics can increase.

For example, furfural extraction of a 2400 SUS (at 100° F.) distillate containing 47.5% aromatics (260 UVA of 11) and 2.7% polar compounds can produce a 1200 SUS oil containing 31.6% aromatics (260 UVA of 2.5) and 1.5% polar compounds. A second extraction of this product (or a more deep initial extraction of the distillate) produces a 1000 SUS oil containing 22.5% aromatics (260 UVA of 1.0) and 1.0% polar aromatics.

In contrast, when the 31.6% aromatic content raffinate is treated with 10 lbs. of HF per 100 lbs. of oil, the resulting neutral oil contains 31.2% aromatics and 0.5% polar compounds. When this acid-treated, furfural raffinate is hydrorefined and contacted with bauxite, the resulting cable oil has an ADF that is at least as low as those exhibited by commercially available polybutene oils of the same viscosity.

Similarly, when a furfural raffinate of an 800–12,000 SUS naphthenic distillate is further treated with a sulfonating agent (e.g., $SO_3$, $H_2SO_4$, oleum, chlorosulfonic acid) in an amount equivalent to from 3–40 lbs. of $SO_3$ per barrel (preferably 10–30 lbs./bbl.) or with 10–40 lbs. of HF per 100 lbs. of oil, the resulting neutralized oil will have a lower ratio of polar aromatics than did the untreated raffinate, and after hydrorefining to cause a reduction of at least 40% in the 260 UVA, the resulting cable oil will have an ADF about as low as that of a polybutene oil of the same viscosity and will have significantly lower ADF than will a similarly prepared hydrorefined oil which has had a final clay contact with attapulgite.

DESCRIPTION OF THE DRAWING

The attached drawing (the figure) illustrates the unexpected benefit of the present invention. The upper curve is a plot of the ADF of a series of oils prepared by the following sequence of steps:

(1) $H_2SO_4$ contacting at various indicated dosages (lb./bbl.) of a naphthenic-acid free naphthenic distillate,
(2) neutralization with alcoholic sodium hydroxide solution (containing about 7% water),
(3) water washing to obtain a neutral oil containing in the range of 500–1000 p.p.m. water,
(4) hydrorefining with sulfided American Cyanamid Company HDS–3A catalyst (nickel-molybdenum oxide catalyst) at 600° F. and 1000 p.s.i.g. (at inlet) of 100% hydrogen at a liquid hourly space velocity (LHSV) of 0.5,
(5) final clay contacting with 20 lb./bbl. of attapulgite.

The above-sequence is that specified in our application Ser. No. 652,026 and, as can be seen from the upper curve, can produce a novel 6000 SUS (at 100° F.) naphthenic cable oil having an ADF below 0.0035.

The lower curve of the figure is a plot of the ADF of a 6000 naphthenic cable oil produced by the same process as that for the upper curve except that there was no final clay contact step. The lower curve shows that this 4-step process (which omits the final adsorbent contact) consistantly produces a cable oil having a lower ADF than does the 5-step process involving a final clay contact. The process which produced the oils of the lower curve is claimed in the present application.

As illustrated by the figure, preferably the acid dosage in the acid treating step should be sufficiently high to reduce the total nitrogen content of the oil to less than 5 p.p.m. to insure less than 5 p.p.m. basic nitrogen in the hydrorefined product (since the hydrorefining step can convert "neutral" nitrogen to basic nitrogen). With a 2000–12,000 SUS distillate or raffinate the preferred 93–120 percent $H_2SO_4$ dosage is in the range equivalent to 30–120 lb./bbl. 100% $H_2SO_4$. The more preferred dosage is equivalent to 40–80 lb./bbl.

In the case of very high nitrogen content stocks, such as a cohobate naphthenic lube having a viscosity above 8000 SUS (see application Ser. No. 850,778), it is frequently more economical to utilize a less than optimum $H_2SO_4$ dosage and to remove basic nitrogen from the hydrorefined product oil by contacting the hydrorefined product with an acid-activated adsorbent clay or adsorbent admixtures containing acid-clay and attapulgite (but not solely with attapulgite).

In addition to the figure, the attached Table I provides further comparative data to aid in illustrating the advantages of the present invention.

TABLE I.—TYPICAL PROPERTIES OF CABLE OILS PREPARED BY VARIOUS PROCESSES

| Oil No. | Base oil | Treatment | Nitrogen, p.p.m. | Power factor at 100° C. Initial | Power factor at 100° C. Aged 4 days, Copper, 115° C. |
|---|---|---|---|---|---|
| 1 | 2500 SUS acid refined oil | No treatment | 2 | 0.002 | 0.04 |
| 2 | | Hydrogenated* | <1 | 0.0011 | 0.001 |
| 3 | | Hydrogenated plus 10 lbs./bbl. attapulgite clay | | 0.0001 | 0.0058 |
| 4 | | Hydrogenated plus 20 lbs./bbl. attapulgite clay | | 0.0001 | 0.0096 |
| 5 | | Hydrogenated plus 10 lbs./bbl. Super Filtrol** | | 0.0001 | 0.0055 |
| 6 | 5,800 SUS distillate | 40 lbs./bbl. $H_2SO_4$ plus 20 lbs./bbl. attapulgite clay plus hydrogenation. | 2 | 0.0004 | 0.0032 |
| 7 | | 40 lbs./bbl. $H_2SO_4$ plus 20 lbs./bbl. attapulgite clay plus hydrogenation plus 20 lbs./bbl. attapulgite clay. | | <0.0001 | 0.0036 |
| 8 | | 60 lbs./bbl. $H_2SO_4$ plus 20 lbs./bbl. attapulgite clay plus hydrogenation plus 20 lbs./bbl. attapulgite clay. | | 0.0001 | 0.0023 |
| 9 | | 60 lbs./bbl. $H_2SO_4$ plus 20 lbs./bbl. attapulgite clay | | 0.0005 | 0.0206 |
| 10 | 5800 SUS distillate | 80 lbs./bbl. $H_2SO_4$ plus 20 lbs./bbl. attapulgite clay | 2 | 0.0003 | 0.0202 |
| 11 | | 100 lbs./bbl. $H_2SO_4$ plus 20 lbs./bbl. attapulgite clay | | 0.0004 | 0.0166 |
| 12 | | 100 lbs./bbl. $H_2SO_4$ plus 20 lbs./bbl. attapulgite clay plus hydrogenation. | | <0.0001 | 0.0034 |
| 13 | | 100 lbs./bbl. $H_2SO_4$ plus 20 lbs./bbl. attapulgite clay plus hydrogenation plus 20 lbs./bbl. attapulgite. | | <0.0001 | 0.0051 |
| 14 | 8800 SUS cohobate | 10 lbs./bbl. $H_2SO_4$ plus hydrogenation plus 10 lbs./bbl. Super Filtrol. | 1 | 0.0001 | 0.0361 |
| 15 | | 25 lbs./bbl. $H_2SO_4$ plus hydrogenation | 23 | | |
| 16 | | 25 lbs./bbl. $H_2SO_4$ plus hydrogenation plus 10 lbs./bbl. Super Filtrol. | <1 | 0.0002 | 0.0160 |
| 17 | | 40 lbs./bbl. $H_2SO_4$ plus hydrogenation | 8 | | |
| 18 | | 40 lbs./bbl. $H_2SO_4$ plus hydrogenation plus 10 lbs./bbl. Super Filtrol. | <1 | 0.0001 | 0.0092 |

*All hydrogenations done with sulfided nickel-molydenum oxide catalyst at 600° F. and 1,000 p.s.i.g. of 100% of hydrogen at 0.5 LHSV.
**Super Filtrol is the tradename for a commercially available acid-activated adsorbent clay.
NOTE.—All $H_2SO_4$ treatments were neutralized and washed. The resulting neutral oils had no haze at 80° C.

Oil 1, the 2500 SUS (at 100° F.) acid refined oil, was prepared by attapulgite contacting a neutralized, $H_2SO_4$-refined (40 lb./bbl.) raffinate obtained by furfural extraction of a naphthenic acid-free naphthenic distillate.

The base oil for producing oils 6–13 was a 5800 SUS naphthenic acid-free naphthenic distillate.

The base oil for producing oils 14–18 was an 8800 SUS cohobate, produced by vacuum distillation of the residuum from a first vacuum distillation of a naphthenic crude. This double distillation procedure is further disclosed in copending application Ser. No. 850,778.

Unless otherwise noted all SUS viscosities are at 100° F.

The invention claimed is:

1. Process of refining a naphthenic distillate oil boiling mainly above 600° F. and having a viscosity in the range of 2000–12000 SUS at 100° F., to produce an oil which is useful as an electrical insulator, said process comprising contacting a charge stock consisting essentially of a straight-run naphthenic distillate or of a straight-run naphthenic distillate which is substantially free of naphthenic acids, with concentrated sulfuric acid, $SO_3$ or HF, allowing the resultant sludge to settle to produce an acidic oil layer, treating said acidic oil layer to provide a neutral oil, and hydrorefining said neutral oil to produce a hydrorefined oil having an ultraviolet absorptivity at 260 millimicrons (260 UVA) at least 40 percent less than that of said naphthenic distillate, said hydrorefining being at a hydrogen consumption of greater than 100 s.c.f./bbl.

2. Process according to claim 1 wherein said naphthenic distillate oil is extracted with an aromatic selective solvent and wherein the raffinate from said extraction is subjected to said contacting with concentrated sulfuric acid, $SO_3$ or HF.

3. Process according to claim 1 wherein said contacting is effected at a temperature of from 0°–90° F. and in the presence of an inert solvent for said distillate, said solvent having a viscosity below 30 SUS at 100° F. and boiling below 350° F.

4. Process according to claim 1 wherein said naphthenic distillate has a viscosity of 3000–12,000 SUS at 100° F. and wherein said contacting is at a temperature from 0°–140° F. with 93–120 percent sulfuric acid at a dosage equivalent to 30–120 lb./bbl. of 100% $H_2SO_4$, and wherein said acidic oil layer is treated with a base and washed with water, or a $C_1$ or $C_4$ aliphatic alcohol, or a $C_2$ to $C_4$ aliphatic aldehyde, or a $C_3$ to $C_5$ aliphatic ketone or mixtures thereof to produce said neutral oil, and wherein said hydrorefining is at a temperature in the range of 550°–750° F. and a hydrogen partial pressure in the range of 800–3000 p.s.i.a.

5. Process according to claim 4 wherein said naphthenic distillate is substantially free of naphthenic acids wherein said contacting is at 0°–90° F. with the equivalent of 40–80 lb./bbl. of $H_2SO_4$, and wherein said hydrorefining is at a temperature in the range of 575°–675° F. and a hydrogen partial pressure in the range of 900–1500 p.s.i.a.

6. Process according to claim 1 wherein said hydrorefining is at a fresh feed LHSV of 0.2–1.0 and recycle LHSV of 2–5, with sulfided nickel-molybdenum oxides as the catalyst, at a temperature below about 750° F. and at hydrogen partial pressures in the range of 1000–1500 p.s.i.a.

7. Process according to laim 4 wherein said neutral oil has an acidity less than the equivalent of 0.05 mg. KOH per gram of oil.

8. Process according to claim 7 wherein said $H_2SO_4$ dosage is insufficient to reduce the total nitrogen of said neutral oil to less than 5 p.p.m. and wherein said hydrorefined product oil is contacted with an adsorbent containing at least 5 lb./bbl. of an acid-activated adsorbent clay.

9. Process according to claim 8 wherein said adsorbent consists of acid-activated adsorbent clay.

10. Process according to claim 1 wherein said neutral oil contains 0–2000 p.p.m. of water and has an acidity less than the equivalent of 0.05 mg. KOH per gram of oil and wherein said hydrorefined oil is used as an electrical insulator and is not contacted with bauxite or a naturally-occurring fuller's earth bleaching clay prior to said use.

11. Process according to claim 1 wherein a hydrorefined oil product is recovered which has an aged power factor lower than would be obtained if said product were contacted with bauxite or a naturally-occurring fuller's earth bleaching clay.

References Cited
UNITED STATES PATENTS

| | | | |
|---|---|---|---|
| 3,502,567 | 3/1970 | Mills et al. | 208—14 |
| 2,944,015 | 7/1960 | Rausch et al. | 208—264 |
| 3,419,497 | 12/1968 | Rocchini et al. | 208—14 |

HERBERT LEVINE, Primary Examiner

U.S. Cl. X.R.

208—14, 143, 264